United States Patent [19]

Roberts

[11] 4,359,789
[45] Nov. 23, 1982

[54] SEWERLESS DISPOSAL SYSTEM

[75] Inventor: George C. Roberts, Los Angeles, Calif.

[73] Assignee: Monogram Industries, Inc., Santa Monica, Calif.

[21] Appl. No.: 496,847

[22] Filed: Aug. 12, 1974

Related U.S. Application Data

[63] Continuation of Ser. No. 221,866, Jan. 31, 1972, abandoned.

[51] Int. Cl.³ .................... E03C 1/01; E03D 9/02; E03D 5/016; E03B 11/00
[52] U.S. Cl. .................................. 4/300; 4/141; 4/318; 4/322; 4/663; 210/167; 210/196; 210/805
[58] Field of Search ........... 4/DIG. 10, 300, 317–323, 4/179; 210/60, 152, 167, 175, 180, 185, 194, 196, 396, 8.67, 76, 321 R; 203/DIG. 5; 110/9 E

[56] References Cited

U.S. PATENT DOCUMENTS

| | | | |
|---|---|---|---|
| 3,079,612 | 3/1963 | Corliss | 4/10 |
| 3,441,015 | 4/1969 | Oatman | 4/179 X |
| 3,474,468 | 10/1969 | Blankenship | 4/131 |
| 3,477,947 | 11/1969 | Kappe | 210/194 |
| 3,543,294 | 11/1970 | Boester | 4/10 |
| 3,611,447 | 10/1971 | Howard | 4/10 |
| 3,622,511 | 11/1971 | Pizzo | 210/152 |
| 3,630,369 | 12/1971 | Nichols | 210/152 |
| 3,646,618 | 3/1972 | Johnson | 4/147 |
| 3,666,106 | 5/1972 | Greene | 4/115 |
| 3,668,710 | 6/1972 | Doud | 4/11 |
| 3,673,614 | 7/1972 | Claunch | 4/10 |
| 3,765,035 | 10/1973 | Mutchler | 4/118 |
| 3,768,924 | 1/1974 | Huffman | 210/321 R |

OTHER PUBLICATIONS

"Waste Unit uses Space Techniques", *Aviation Week & Tech.*, 12/1969, pp. 49 & 50.

*Primary Examiner*—Stephen Marcus
*Attorney, Agent, or Firm*—William A. Kemmel, Jr.

[57] ABSTRACT

A waste disposal system is disclosed which includes apparatus for treating water which has been used for cleaning, washing and for flushing toilets and for disposing of waste products by incineration. The total output of the system to the environment is then reclaimed wash water of tertiary treatment quality plus $CO_2$ and the ash resulting from the incineration of solid wastes. In alternative embodiments, systems designed for ships, multiple unit dwellings or small communities can operate on a substantially continuous duty cycle with full utilization being made, if desired, of the heat energy required for the incineration process, and for substantially reducing fresh water quantity requirements in all such installations through the use of recirculating toilets.

17 Claims, 2 Drawing Figures

SEWERLESS DISPOSAL SYSTEM

This ia a continuation of application Ser. No. 221,866, filed Jan. 31, 1972, now abandoned.

BACKGROUND OF THE INVENTION

1. Field of the Invention

The present invention relates to waste disposal systems and, more particularly, to a sewerless disposal system which reclaims "grey" water and which incinerates solid wastes, and recycles "black" water for toilet purposes, returning to the environment reclaimed water of quality equal to tertiary treatment and hence forth called tertiary quality water, ash, $CO_2$, and if not condensed, water vapor.

2. Description of the Prior Art

In the past, a necessary concomitant of human activity has been the disposal of the various waste products generated. While this generally includes the disposal of rubbish, trash, and the like, it also includes the disposal or other disposition of waste matter which normally requires a sewage system. In the past, sewerage systems have either been of a public or community type in which a series of pipe lines interconnect the waste disposal systems of all buildings in a community with a sewage treatment plant that is designed to dispose of the treated effluent. Depending upon the location of the community, generally the sewage is treated to neutralize any disease causing potential and to remove noxious or offensive materials and odors.

Other, more sophisticated sewage treatment plants may actually further treat the solid wastes and return them to the economy as fertilizer or other byproducts, and the treated water component is either discharged into a convenient waterway or is permitted to percolate into the surrounding ground. Most recently, plans have been formulated to utilize reclaimed water for watering parks, golf courses, and to provide ponds or lakes and for other recreational purposes.

In the absence of community sewer systems, dwellings have included private sewage disposal facilities, such as cesspools and septic tanks which accumulate the wastes and permit the fluid components thereof to discharge into earth through a drainage field, while the solid components are decomposed by natural means. Yet other sewage disposal facilities are no more sophisticated than a direct pipe into a nearby body of water, with no treatment of the sewage attempted.

In recent years, a great deal of attention has been directed to the environment and to the protection and preservation of the environment, as a natural resource, with emphasis upon environmental pollution, of which sewage disposal can be a major cause. Not only must the aesthetic problems of waste management be considered, but consideration must be given to what the effect of large quantities of organic and chemical waste products, which tend to unbalance the natural systems and, for example, cause eutrophication of lakes and other bodies of water, can ultimately have on the environment.

Another consideration in dealing with the preservation of the natural resources is the profligate exploitation of the water resource in connection with the human habitation. Vast quantities of water are consumed in a typical household, only a fraction of which is utilized for food or cooking. Most of the water is employed for laundry purposes, washing, baths or showers, and in the disposal of human wastes.

Great quantities of water are also utilized for other domestic tasks, such as watering lawns or gardens, washing cars, and the like. In fairly arid areas, water is used for evaporative cooling systems during hot weather.

In dealing with the problem of waste management, two categories have been established. A first, known as "grey water," includes probably the major portion of the water utilized in human activities. The "grey" water would include all of the waste currently handled by sewer systems excepting only the toilet waste product.

The toilet wastes are considered "black" water and include the human excrement which must be ultimately disposed of. This includes the large quantities of water which are generally required in toilets to dispose of a relatively small quantity of human waste. In most sewage systems, the grey water and black water effluents are indiscriminately mixed within the sewer and are ultimately applied to the same treatment facility.

It has been found through careful study that the present systems of managing wastes are, among other things, extremely wasteful of the water resource that comprises the major portion of the wastes that must be treated. Further, it has been observed that most systems that are intended to dispose of human wastes tend to be classified in two categories. The first category is the "dry" toilet which utilizes little or no water for flushing purposes and relies upon either electric or flame incineration to dispose of human wastes. Alternatively, conventional flushing type toilet systems can be provided, which include a quantity of water with the wastes which must be disposed of with the waste material, although in some embodiments of the solid phase is accomplished through incineration.

There have been efforts in the prior art to provide waste systems that avoided the conventional private or public sewage systems. A partial solution was suggested in the patent to M. J. Breen, U.S. Pat. No. 3,005,205, issued Oct. 24, 1961 which taught a unitary washroom assembly which included, in a single prefabricated unit, a washroom and/or toilet with common connections to a single collecting tank which in fact functions as a septic tank. The septic tank however, in conventional fashion, must drain into a drainage field and no attempt is made to reclaim any of the liquid and the septic tanks, in conventional fashion, provides an discharge into a drainage field.

More recently, a household water conservation system was described in U.S. Pat. No. 3,543,294 issued to Carl F. Boester on Nov. 24, 1970. This patent teaches the filtration and aeration of household waste water other than toilet waste.

The water thus treated serves as the source of flushing water in conventional toilet systems. If the water exceeds a predetermined volume, it is discharged into a conventional drainage field. The waste from the conventional toilet is applied to a similar storage system and subjected to aerobic processes. The liquid effluent, after treatment is discharged into the drainage field as well.

It is clear that the Boester system requires two water storage systems, one of which might be considered as a grey water system and the other a black water storage system. The water recovered from the grey water system is used for flushing toilets and the black water system is treated the conventional way and discharged into a drainage field.

In recent years, a third type of flushing toilet system has been developed which is a self-contained, recirculating toilet system. A typical system of the third type has been disclosed in the patents to J. W. Dietz, et al., U.S. Pat. No. 3,067,433; R. F. Corliss, U.S. Pat. No. 3,079,612; or to N. J. Palmer, U.S. Pat. Nos. 3,473,171 and 3,537,590. Such toilet systems reduce the demand for water in their operation and effectively concentrate the waste products for more convenient disposal.

In order to provide a substantially sewerless community or a sewerless house, it has been discovered that a combination of a "grey" water recovery system and a novel "black" water waste incinerator can be efficiently utilized. However, because of the quantities of energy required to "incinerate" the water component of any "black" water system, it has been determined that some means should be provided to concentrate and separate the human wastes from the other household waste products.

In recent years, the recirculating toilet systems, mentioned above, have achieved great success and popularity in vehicles, such as boats, aircraft, and campers and trailers. Further, other embodiments of such recirculating toilet systems have been utilized in remote locations where permanent sewer connections are not available.

These recirculating toilet systems operate on a basic charge of six gallons of liquid and can operate for approximately 80 to 90 utilizations on a single charge. If one or more of these recirculating toilet systems were employed in a household, depending upon the number of occupants and the frequency with which the toilets are utilized, these units would require emptying and refilling approximately twice per month.

To assist in the emptying of these recirculating toilet systems when installed in vehicles, such as boats, aircraft, campers, and trailers, macerator-grinder pumps have been developed. One such pump has been disclosed in U.S. Pat. No. 3,380,673.

These macerator-grinder pumps tend to convert the stored waste products and liquid into a finely divided slurry which is capable of being pumped to an appropriate disposal or receptacle. In the past, such a waste slurry was disposed of in a regular sewer system.

SUMMARY OF THE INVENTION

According to the present invention, one or more recirculating toilet systems are either individually or collectively connected to a macerator-grinder pump. The pump is connected to an incinerator which can completely and safely dispose of the solid waste component.

All other waste drains can be commonly connected to a "grey water" recovery system, which can filter and clarify the water for reuse.

In a preferred embodiment of the present invention, the water recovery system also includes means for pumping the resulting solid waste to an incinerator for disposal therein. In the sewerless waste management system of the present invention, it is understood that the operation of the water recovery device and the incineration system are on an "as needed" basis. Each system, while commonly connected to the household waste systems, will be operated on demand, and will remain quiescent in the periods between successive uses.

In alternative embodiments, when the waste disposal systems of the present invention are employed in conjunction with a multi-unit dwelling or a structure housing large numbers of people, such as a hotel, office building, ship, or the like, the efficiency of the present invention increases disproportionately. Since larger numbers of people will increase the frequency of operation of the waste disposal device, it is then possible to consider a utilization of the energy that is excess to the needs of the incineration system and which would normally be lost to the environment through the exhaust flue of the incinerator.

The exhaust gases of the incineration system are odorless, smokeless, and at an approximate temperature of 1000° F. Through the use of appropriate heat exchange devices, this heat energy, which might be otherwise wasted, can be employed to provide hot water, heating or cooling to the structure, and thus reduce some of the demands upon the public sources of energy which would otherwise be required to serve these needs.

Further, the water vapor produced by the incinerator system could be condensed and comingled with the reclaimed water effluent of the "grey" water device.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENTS

Figure 1:
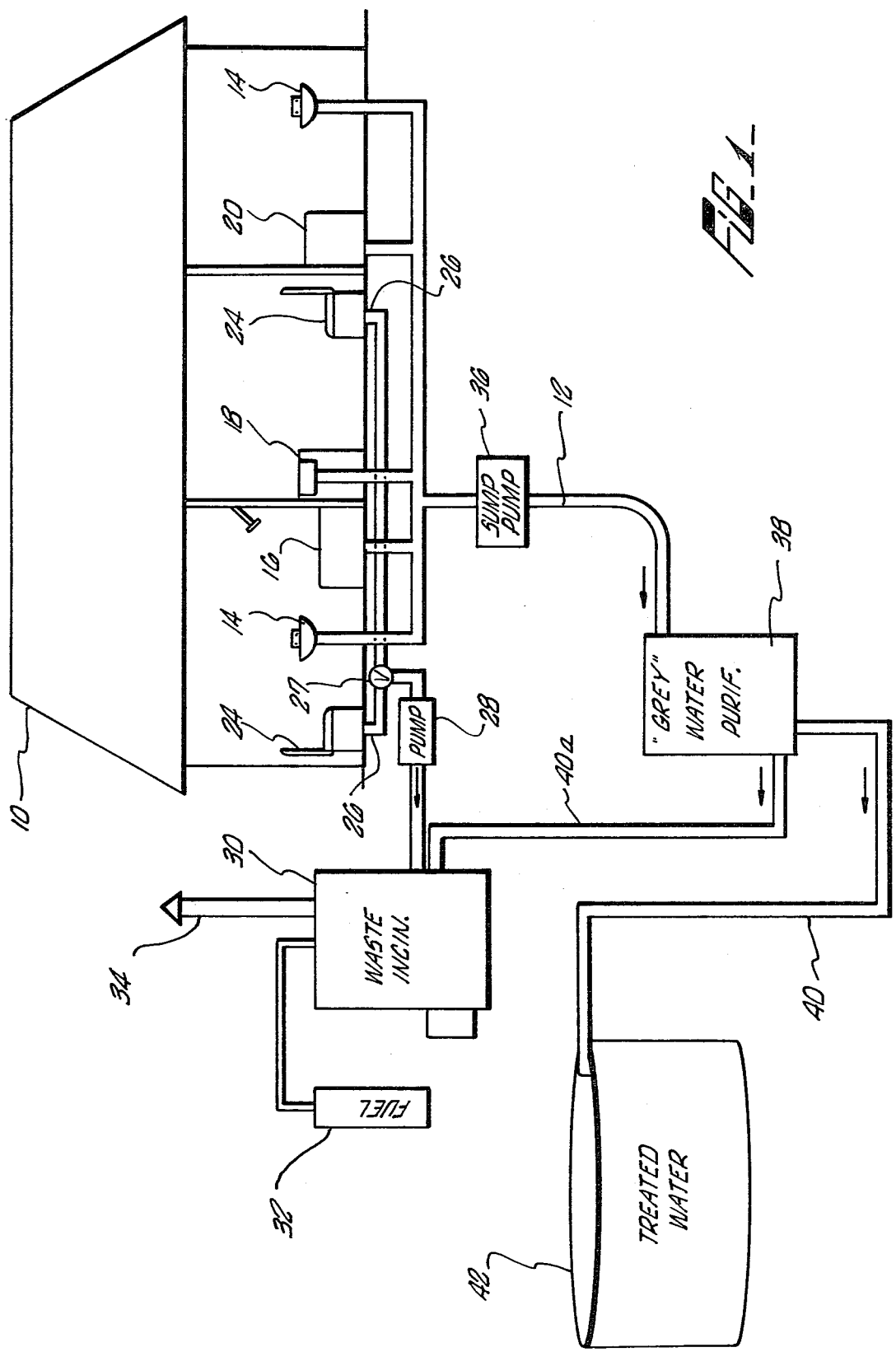
FIG. 1 is an idealized block diagram of a waste management system according to the present invention as applied.

Turning first to FIG. 1, there is shown, in an extremely idealized fashion, an embodiment of a sewerless waste management system adapted for use with a single family dwelling having a plurality of toilets. It is to be understood that a system could as easily be connected to any form of shelter which would have a waste disposal problem. It is to be assumed, however, that the structure has access to running water.

As seen in FIG. 1, a common waste line 12 has been connected to receive grey water effluent of a lavatory 14, a bathtub 16, which may include a shower, a kitchen sink 18, and a washing machine 20. For the purposes of the present invention, the black water discharges from the toilets are not connected to the inlet of the common waste line 12.

For the purposes of more efficiently eliminating human wastes, a recirculating toilet 24 is recommended in the preferred embodiment. Each of the recirculating toilets 24 comprises a bowl and is adapted to be connected to the inlet of a black water waste drain 26 through an outlet therefrom. When using more than one toilet 24, the waste drains 26 are connected to a multipositional valve 27 which selectively discharges the output of each toilet into a macerator-grinder pump 28. The valve 27 may be manually or automatically controlled, depending on external considerations. A macerator-grinder pump 28 is connected to receive the individual contents of the recirculating toilet 24 at such times as the system is drained by the action of the valve 27.

The output of the macerator-grinder pump 28 is applied to a waste incineration system 30 for decomposing toilet waste incineration. The waste incineration system 30 is connected to a source of fuel 32 and includes an exhaust stack 34 which returns the $CO_2$ and water vapor that is generated through the incineration of wastes to the atmosphere.

The main waste line 12 preferably includes a sump pump 36 connected to a "grey" water purification system 38, which provides a first output of treated water of tertiary quality, through a water line 40, which can be stored in a reservoir 42, utilized for such purposes as irrigation, watering animals, or may be returned to ponds, lakes, or streams, or otherwise disposed of, without polluting the environment. A second output from the water purification system 38 is preferably fed through a line 40a to the waste incinerator 30. Solid nonburnable waste may be removed at the purifier 38; however, solid burnable waste may require a macerator-grinder pump similar to pump 28.

In operation, the accumulated contents of the recirculating toilets 24 are periodically drained by valve 27, and with the aid of the macerator pump 28, the sludge is pumped into the incinerator 30, which is thus charged for operation. The incinerator, when operated, completely incinerates the comminuted slurry output of the macerator-grinder 28, converting the liquified slurry to water vapor, $CO_2$, and ash, without odor or smoke.

The remaining water utilization elements of the dwelling 10 including the bath 16, lavatory sink 14, the kitchen sink 18, and the washing machine 20, as they are used, will apply their grey water waste to the drain system 12 and sump pump 36 and which may or may not have an accumulating tank. A small pump associated with the water purifier 38 can be utilized to maintain a positive pressure upon the water purification system.

As noted above, the treated water is applied through the output line 40 to a reservoir 42. Solid wastes accumulated in the purification system 38 and to the extent burnable can be handled by the waste incineration system 30, either by a direct connection thereto or by providing an alternative connection to the macerator-grinder 28, or a separate pump so that the solid waste can be converted into a slurry capable of being transported to the incinerator.

Figure 2:
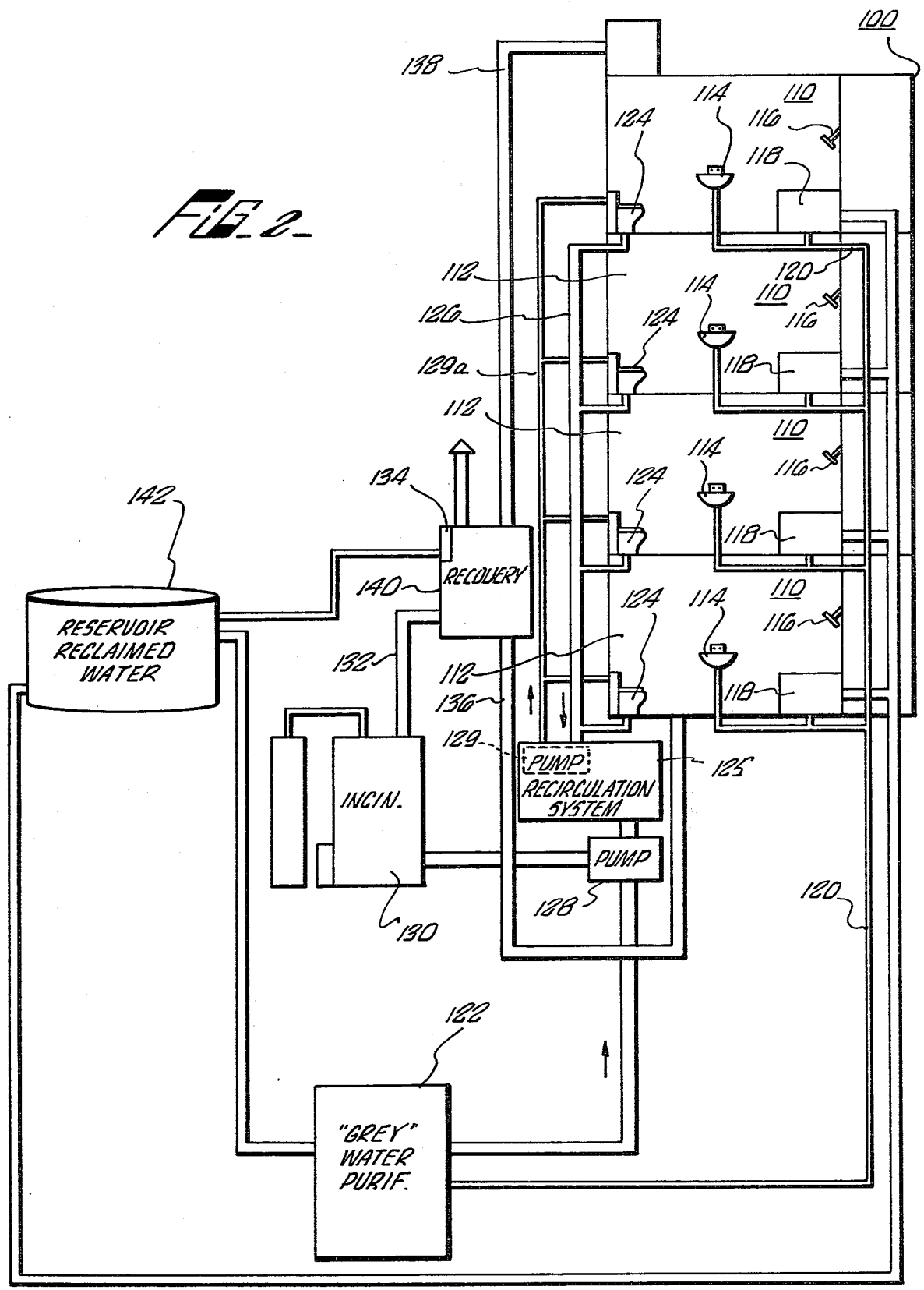
FIG. 2 is an idealized block diagram of a waste management system as applied to a multiple dwelling.

Turning next to FIG. 2, there is shown an alternative embodiment of the system of the present invention as applied to a multiple occupancy dwelling 100. As shown, the multiple dwelling 100 possesses a plurality of separate floors 110, portions of which are shown in the figure. A plurality of bathrooms 112 are indicated, and it is assumed that they are plumbed in conventional fashion and have washing facilities, including a sink 114, a shower 116, and a tub 118, which are connected to the inlet of a common waste drain 120. As in the system of FIG. 1, the grey water common waste drain 120 is connected only to the sinks 114, tubs 118, and showers 116 and does not include the toilets. The output of the drain 120 is fed to a "grey" water purification system 122.

In the building 100, the toilets 124 have bowls are preferably of the recirculating type and are preferably connected to a common line which feeds the "black" water drain 126 which is connected to a recirculation system 125 which includes a pump 129 for recirculation of the black waste water through lines 129a to the individual toilets 124.

The solid waste is fed from an outlet system 125 to the inlet of a conduit and thence to a macerator-grinder pump 128 that applies its output to an incinerator system 130. An additional input to the macerator-grinder pump 128 may be the solid waste output of the water treatment unit 122. Alternatively, the solid wastes may be applied directly to the incinerator 130.

It will be obvious to mechanics skilled in the art that appropriate control systems are included for the orderly draining of the several toilets 124. However, if the multiple habitation 100 is a managed apartment or a hotel, the individual dweller generally would not be responsible for the servicing of the waste management system. Rather, mechanical programming devices or employees would, on some predetermined schedule, drain the several toilets 124 individually in a manner so as not to overload the facilities of the incinerator system 130.

It is in a system such as illustrated in FIG. 2 that part of the energy that is required to incinerate waste can be utilized to some useful purpose, rather than being lost to the environment. As shown in FIG. 2, an exhaust stack 132 of the incinerator 130 is applied to an exchanger-condenser 134 in which the heat energy of the incinerator can be utilized in the building 100 hot water system (not shown) or in the building 100 heating and cooling systems. Recovered heat energy is shown as being coupled to a first return line 136 which may be part of the building hot water system, and a second heat return line 138 is shown applied to the building heating and cooling system.

If desirable, a condenser 140 can be provided to recover the exhaust water vapor and convert it into liquid water which can be returned to a water storage facility 142, to which the output of the water purification system 122 is normally applied, or for recharging the holding tank 125 as needed.

The water storage unit 142 can be connected to supply the water intake lines of structure 100 as an additional source of fresh water, the quality of which is adequate for washing and showering purposes in the bathrooms 110 that are shown. Such water may also be used for irrigation, livestock, or can be permitted to return to the environment through discharge into bodies of water or through ground percolation.

An alternative system that is illustrated in FIG. 2 could employ a multiple recirculating toilet in which a plurality of recirculating toilets share a common reservoir.

If the system of FIG. 2 can be considered as a combination of separate blocks such as the treatment and recovery block 150, the grey water portion of the dwelling 152 and the black water portion of the dwelling 154, then an alternative system is illustrated in block diagram in FIG. 3.

Appropriate control circuits are provided so that when one or more toilets are used, a sufficient number of pumps can be energized to apply flushing liquid from the reservoir to the toilets being utilized. The solid wastes are collected in the reservoir and can be periodically transferred into the recovery system 50 which, as pointed out above, would incinerate the "black" water wastes and would, as in the system of FIG. 2, reclaim the grey water output, returning heat energy to the building via the pipe 138 and treated water, as well, for washing purposes.

Thus, there has been shown a sewerless waste management system that does not require a discharge of treated effluent, but rather incinerates solid wastes and reclaims grey water to tertiary quality for subsequent utilization. The only output of the system which must be disposed of is the treated water of tertiary quality which may be used for household purposes, for irrigation, or for ponds and reservoirs. There is, however, no requirement that a treated waste be applied to a drainage field.

What is claimed as new is:

1. An improved sewerless disposal system for waste liquid and solid material from a dwelling having toilet and household waste producing units other than toilets, such as baths, sinks and washing machines, said system comprising:
   (a) recirculating toilet means including a bowl having a toilet waste receiving opening and an outlet, means for supplying liquid to said bowl, means connected to said outlet of said toilet bowl for receiving said liquid from said liquid supplying means and toilet waste from said bowl, and means for separating liquid and means for causing recirculation of liquid from said receiving means through said supply means, said bowl and to said receiving means,
   (b) an outlet from said receiving means of said recirculating toilet means,
   (c) a first piping structure having inlet means connected only to said outlet of said receiving means to receive only toilet waste material therefrom,
   (d) waste producing means other than toilets in said dwelling,
   (e) a second piping structure having inlet means connected only to said waste-producing means other than toilets to receive waste water therefrom,
   (f) waste water purifier means having an inlet connected only to said second piping structure for receiving material from said second piping structure for generating water of tertiary quality, and for generating separate waste, said waste water purifier means having an outlet for said water and an outlet for said separate waste, and
   (g) receiving and holding means, means connecting said first piping structure to said receiving and holding means for conducting said toilet waste from said first piping structure to said receiving and holding means, and means connecting said outlet for said separate waste of said waste water purifier means for conducting said separate waste from said waste water purifier means to said receiving and holding means.

2. A combination according to claim 1 which includes a pump connected to said first piping structure for forcing toilet waste into said waste receiving and holding means.

3. A combination according to claim 1 further including a multipositionable valve adapted to couple a plurality of recirculating toilet systems to said first piping structure for selectively applying the output of individual ones of the toilet systems to said first piping structure.

4. A combination according to claim 1 which includes a pump interconnecting said water purifier with said receiving and holding means.

5. The combination of claim 1, said means for receiving said toilet waste being a waste incinerator.

6. A combination according to claim 5 which includes a grinder pump in said first piping structure for forming a slurry from said toilet waste and for pumping the slurry to the incinerator.

7. A combination according to claim 5 and further including liquid conduit means and a recovery heat exchanger coupled to and heated by said incinerator means and coupled to said liquid conduit means for generating water vapor.

8. A combination according to claim 7, and means for condensing said water vapor and collecting the resulting condensate.

9. The combination of claim 1, and means for periodically discharging toilet waste material into said first piping structure.

10. A combination according to claim 9 which includes a grinder pump connected to said first piping structure for creating a slurry from said solid waste, and forcing said slurry to said receiving and holding means.

11. The sewerless disposal system of claim 1, wherein said means connected to said first piping structure comprises means for decomposing said toilet waste material.

12. The combination of claim 1, and means for delivering water from said waste water purifier to a said waste producing means other than toilet.

13. A method of disposing of the toilet waste and other waste generated in a dwelling from toilets and non-toilet waste generators comprising:
   (a) flushing toilet waste from a toilet bowl by liquid delivered thereto,
   (b) receiving substantially only said flushed liquid and toilet waste in a receptacle connected to the outlet of the toilet bowl,
   (c) separating said liquid from said flushed toilet waste in said receptacle and discharging said thus separated flushed toilet waste from said receptacle,
   (d) recirculating said liquid through a plurality of flushing cycles through said toilet bowl and receptacle,
   (e) discharging non-toilet waste-free of toilet waste from non-toilet waste generators,
   (f) providing a waste water purifier,
   (g) transferring said non-toilet waste to said waste water purifier,
   (h) purifying said non-toilet waste in said waste purifier to generate separate waste and purified water of tertiary quality,
   (i) providing a receiver and holder for waste,
   (j) transferring said flushed, separated toilet waste to said receiver and holder,
   (k) transferring said separate waste from said water purifier to said receiver and holder,
   (l) receiving said purified water from said waste water purifier and delivering substantially all of said purified water to other than a toilet.

14. The method of claim 13, and further comprising decomposing said received and held waste.

15. The method of claim 14, wherein said decomposing is by incineration.

16. The method of claim 14, wherein said decomposing is intermittent.

17. The method of claim 13 and further comprising recirculating said purified water to a non-toilet waste generator in the dwelling.

* * * * *